US012217296B2

(12) United States Patent
Mani et al.

(10) Patent No.: US 12,217,296 B2
(45) Date of Patent: Feb. 4, 2025

(54) SYSTEMS AND METHODS USING DEEP JOINT VARIATIONAL AUTOENCODERS

(71) Applicant: Walmart Apollo, LLC, Bentonville, AR (US)

(72) Inventors: Venugopal Mani, Sunnyvale, CA (US); Jianpeng Xu, San Jose, CA (US); Hyun Duk Cho, San Francisco, CA (US); Sushant Kumar, San Jose, CA (US); Kannan Achan, Saratoga, CA (US); Aysenur Inan, Mountain View, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 469 days.

(21) Appl. No.: 17/589,229

(22) Filed: Jan. 31, 2022

(65) Prior Publication Data

US 2023/0245204 A1    Aug. 3, 2023

(51) Int. Cl.
*G06Q 30/00* (2023.01)
*G06N 3/045* (2023.01)
*G06N 3/047* (2023.01)
*G06Q 30/0601* (2023.01)

(52) U.S. Cl.
CPC ......... *G06Q 30/0631* (2013.01); *G06N 3/045* (2023.01); *G06N 3/047* (2023.01)

(58) Field of Classification Search
CPC ..... G06Q 30/0631; G06N 3/047; G06N 3/045
See application file for complete search history.

(56) References Cited

U.S. PATENT DOCUMENTS

| 10,089,675 B1 | 10/2018 | Rastogi et al. |
| 11,540,017 B1 | 12/2022 | Moor et al. |
| 2013/0024318 A1 | 1/2013 | Zhang et al. |
| 2015/0278350 A1 | 10/2015 | Nice et al. |
| 2018/0121987 A1 | 5/2018 | Akkiraju et al. |
| 2021/0089884 A1 | 3/2021 | Macready et al. |

(Continued)

FOREIGN PATENT DOCUMENTS

KR    102070049 B1    4/2020

OTHER PUBLICATIONS

Askari, et al., "Joint Variational Autoencoders for Recommendation with Implicit Feedback", Aug. 2020, arXiv, 9 pages.*

(Continued)

*Primary Examiner* — Kathleen Palavecino
(74) *Attorney, Agent, or Firm* — Morgan, Lewis & Bockius LLP; Manita Rawat

(57) ABSTRACT

Systems and methods for generating top-k recommendation using latent space representations generated by deep joint variational autoencoder processes are disclosed. A user identifier is received and a set of prior interactions associated with the user identifier is obtained. A set of latent space representations of the set of prior interactions is generated using a trained inference model. The trained inference model includes a joint variational autoencoder model. A set of k-recommended items is generated based on a comparison of the set of latent space representations of the set of prior interactions and a set of latent space representations of one or more items. A user interface including the set of k-recommended items is generated.

20 Claims, 10 Drawing Sheets

(56) References Cited

U.S. PATENT DOCUMENTS

| | | | |
|---|---|---|---|
| 2021/0248449 | A1 | 8/2021 | Sun et al. |
| 2021/0373921 | A1 | 12/2021 | Neumann |
| 2023/0101928 | A1 | 3/2023 | Pande et al. |

OTHER PUBLICATIONS

Mani, et al., "On Variational Inference for User Modeling in Attribute-Driven Collaborative Filtering", Dec. 2020 EEE International Conference on Big Data, 9 pages.
Balasubramanian, et al., "Variational Inference for Category Recommendation in E-Commerce platforms", Apr. 2021, arXiv, 8 pages.
Rabiu, et al., "Exploiting dynamic changes from latent features to improve recommendation using temporal matrix factorization", 2020, Egyptian Informatics Journal 22: 285-294.
Liu, "Modeling Users' Dynamic Preference for Personalized Recommendation", Jul. 2015, Proceedings of the Twenty-Fourth International Joint Conference on Artificial Intelligence, 1785-1791.
Chalyi, et al., "Temporal Modeling of User Preferences in Recommender System", 2020, 11 pages.
Li, et al., "Collaborative Variational Autoencoder for Recommender Systems", Aug. 2017, KDD '17: Proceedings of the 23rd ACM SIGKDD International Conference on Knowledge Discovery and Data Mining, 305-314.
T. Xiao et al., "Neural variational matrix factorization for collaborative filtering in recommendation systems," Applied Intelligence, (Year: 2019) 49:3558-3569.

\* cited by examiner

SYSTEMS AND METHODS USING DEEP JOINT VARIATIONAL AUTOENCODERS

TECHNICAL FIELD

This application relates generally to machine learning and, more particularly, to recommendations using deep joint variational autoencoders.

BACKGROUND

In environments configured to provide interactions with multiple variations of similar elements, users may develop or change preferences for interactions with specific versions of a variant element or item. For example, in an e-commerce environment, an individual user may express one or more preferences for brands, styles, etc. of specific items available within the e-commerce interface. Various network interfaces, such as e-commerce interfaces, are configured to present one or more interface pages including a plurality of containers (or slots). A plurality of content elements may be available for each container.

Personalizing user interfaces, such as e-commerce interfaces, drives user satisfaction and engagement for network interfaces. Current network interfaces are capable of suggesting categories or items based on prior interactions but require express extraction of user preferences from transaction data. Current systems implement discrete feature selection or extraction steps that introduce unnecessary complexity and potential errors into the customization process.

SUMMARY

In various embodiments, a system is disclosed. The system includes a non-transitory memory having instructions stored thereon and a processor configured to read the instructions. The processor is configured to receive a user identifier and receive a set of prior interactions associated with the user identifier. The processor is further configured to generate a set of latent space representations of the set of prior interactions using a trained inference model. The trained inference model includes a joint variational autoencoder model. The processor is further configured to generate a set of k-recommended items based on a comparison of the set of latent space representations of the set of prior interactions and a set of latent space representations of one or more items and generate a user interface including the set of k-recommended items.

In various embodiments, a non-transitory computer readable medium having instructions stored thereon is disclosed. The instructions, when executed by a processor cause a device to perform operations including receiving a user identifier corresponding to a set of prior interactions, generating a set of latent space representations of the set of prior interactions using a trained inference model, generating a set of k-recommended items based on a comparison of the set of latent space representations of the set of prior interactions and a set of latent space representations of one or more items, and generating a user interface including the set of k-recommended items. The trained inference model includes a joint variational autoencoder model.

In various embodiments, a computer-implemented method is disclosed. The computer-implemented method includes the steps of receiving a set of prior interactions, generating a set of latent space representations of the set of prior interactions using a trained inference model, generating a set of k-recommended items based on a comparison of the set of latent space representations of the set of prior interactions and a set of latent space representations of one or more items, and generating a user interface including the set of k-recommended items. The trained inference model includes a joint variational autoencoder model.

BRIEF DESCRIPTION OF THE DRAWINGS

The features and advantages of the present invention will be more fully disclosed in, or rendered obvious by the following detailed description of the preferred embodiments, which are to be considered together with the accompanying drawings wherein like numbers refer to like parts and further wherein.

DETAILED DESCRIPTION

Figure 1:
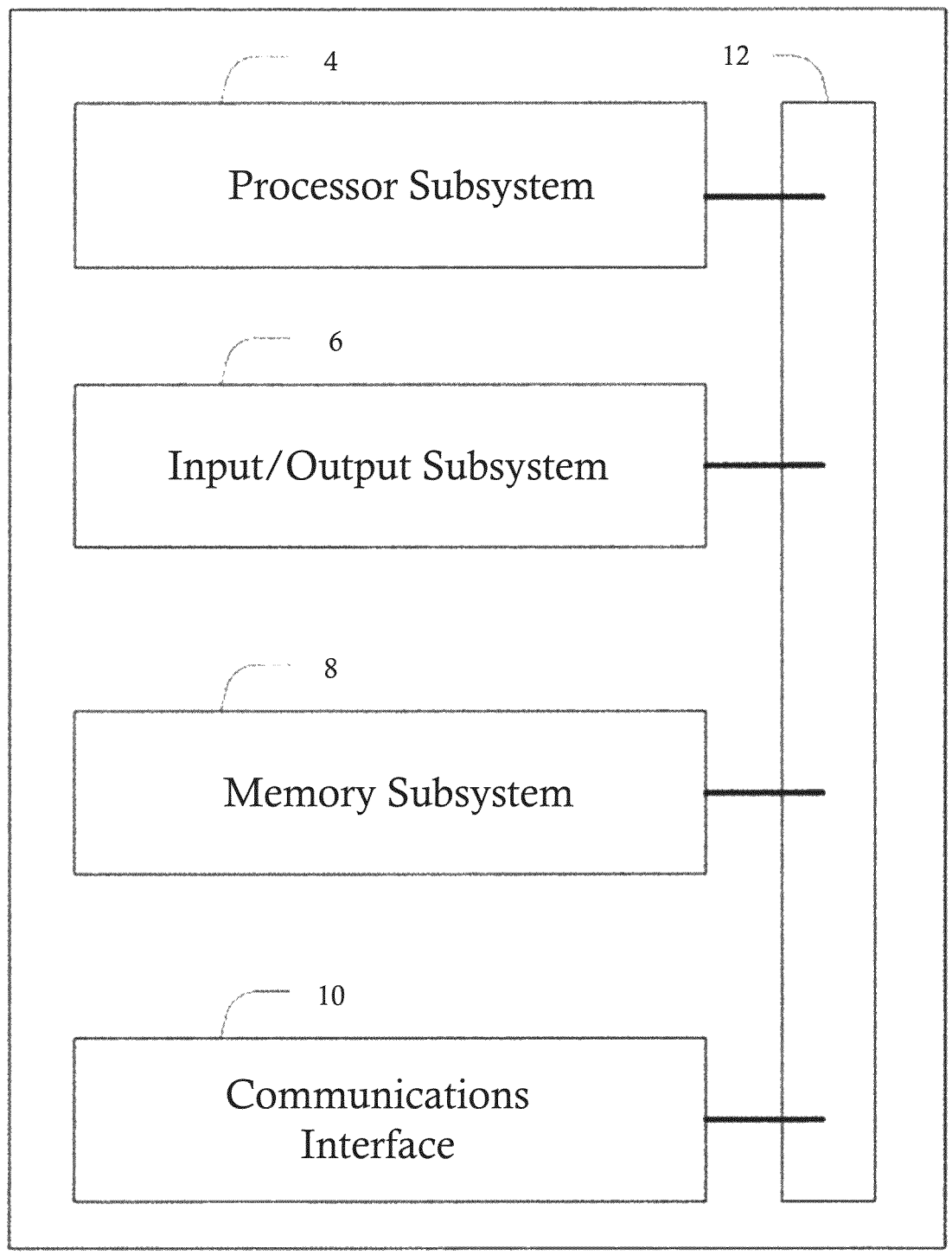
FIG. 1 illustrates a block diagram of a computer system, in accordance with some embodiments.

The description of the preferred embodiments is intended to be read in connection with the accompanying drawings, which are to be considered part of the entire written description of this invention. The drawing figures are not necessarily to scale and certain features of the invention may be shown exaggerated in scale or in somewhat schematic form in the interest of clarity and conciseness. Terms concerning data connections, coupling and the like, such as "connected" and "interconnected," and/or "in signal communication with" refer to a relationship wherein systems or elements are electrically and/or wirelessly connected to one another either directly or indirectly through intervening systems, as well as both moveable or rigid attachments or relationships, unless expressly described otherwise. The term "operatively coupled" is such a coupling or connection that allows the pertinent structures to operate as intended by virtue of that relationship.

In various embodiments, systems and methods of personalized user and item recommendations are disclosed. A trained inference model is generated using a deep joint variational autoencoder architecture. The trained inference model is configured to use latent space representations to provide complex understanding of a feature space without the need to perform time consuming feature extraction processes. The trained inference model may be trained by a training set including past interaction data. The trained inference model is configured to retrieve a set of candidate items from a pool of items based on latent space representations.

FIG. 1 illustrates a computer system configured to implement one or more processes, in accordance with some embodiments. The system 2 is a representative device and may comprise a processor subsystem 4, an input/output subsystem 6, a memory subsystem 8, a communications interface 10, and a system bus 12. In some embodiments, one or more than one of the system 2 components may be combined or omitted such as, for example, not including an input/output subsystem 6. In some embodiments, the system 2 may comprise other components not combined or comprised in those shown in FIG. 1. For example, the system 2 may also include, for example, a power subsystem. In other embodiments, the system 2 may include several instances of the components shown in FIG. 1. For example, the system 2 may include multiple memory subsystems 8. For the sake of conciseness and clarity, and not limitation, one of each of the components is shown in FIG. 1.

The processor subsystem 4 may include any processing circuitry operative to control the operations and performance of the system 2. In various aspects, the processor subsystem 4 may be implemented as a general purpose processor, a chip multiprocessor (CMP), a dedicated processor, an embedded processor, a digital signal processor (DSP), a network processor, an input/output (I/O) processor, a media access control (MAC) processor, a radio baseband processor, a co-processor, a microprocessor such as a complex instruction set computer (CISC) microprocessor, a reduced instruction set computing (RISC) microprocessor, and/or a very long instruction word (VLIW) microprocessor, or other processing device. The processor subsystem 4 also may be implemented by a controller, a microcontroller, an application specific integrated circuit (ASIC), a field programmable gate array (FPGA), a programmable logic device (PLD), and so forth.

In various aspects, the processor subsystem 4 may be arranged to run an operating system (OS) and various applications. Examples of an OS comprise, for example, operating systems generally known under the trade name of Apple OS, Microsoft Windows OS, Android OS, Linux OS, and any other proprietary or open source OS. Examples of applications comprise, for example, network applications, local applications, data input/output applications, user interaction applications, etc.

In some embodiments, the system 2 may comprise a system bus 12 that couples various system components including the processing subsystem 4, the input/output subsystem 6, and the memory subsystem 8. The system bus 12 can be any of several types of bus structure(s) including a memory bus or memory controller, a peripheral bus or external bus, and/or a local bus using any variety of available bus architectures including, but not limited to, 9-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect Card International Association Bus (PCMCIA), Small Computers Interface (SCSI) or other proprietary bus, or any custom bus suitable for computing device applications.

In some embodiments, the input/output subsystem 6 may include any suitable mechanism or component to enable a user to provide input to system 2 and the system 2 to provide output to the user. For example, the input/output subsystem 6 may include any suitable input mechanism, including but not limited to, a button, keypad, keyboard, click wheel, touch screen, motion sensor, microphone, camera, etc.

In some embodiments, the input/output subsystem 6 may include a visual peripheral output device for providing a display visible to the user. For example, the visual peripheral output device may include a screen such as, for example, a Liquid Crystal Display (LCD) screen. As another example, the visual peripheral output device may include a movable display or projecting system for providing a display of content on a surface remote from the system 2. In some embodiments, the visual peripheral output device can include a coder/decoder, also known as Codecs, to convert digital media data into analog signals. For example, the visual peripheral output device may include video Codecs, audio Codecs, or any other suitable type of Codec.

The visual peripheral output device may include display drivers, circuitry for driving display drivers, or both. The visual peripheral output device may be operative to display content under the direction of the processor subsystem 6. For example, the visual peripheral output device may be able to play media playback information, application screens for application implemented on the system 2, information regarding ongoing communications operations, information regarding incoming communications requests, or device operation screens, to name only a few.

In some embodiments, the communications interface 10 may include any suitable hardware, software, or combination of hardware and software that is capable of coupling the system 2 to one or more networks and/or additional devices. The communications interface 10 may be arranged to operate with any suitable technique for controlling information signals using a desired set of communications protocols, services or operating procedures. The communications interface 10 may comprise the appropriate physical connectors to connect with a corresponding communications medium, whether wired or wireless.

Vehicles of communication comprise a network. In various aspects, the network may comprise local area networks (LAN) as well as wide area networks (WAN) including without limitation Internet, wired channels, wireless channels, communication devices including telephones, computers, wire, radio, optical or other electromagnetic channels, and combinations thereof, including other devices and/or components capable of/associated with communicating data. For example, the communication environments comprise in-body communications, various devices, and various modes of communications such as wireless communications, wired communications, and combinations of the same.

Wireless communication modes comprise any mode of communication between points (e.g., nodes) that utilize, at least in part, wireless technology including various protocols and combinations of protocols associated with wireless transmission, data, and devices. The points comprise, for example, wireless devices such as wireless headsets, audio and multimedia devices and equipment, such as audio players and multimedia players, telephones, including mobile telephones and cordless telephones, and computers and computer-related devices and components, such as printers, network-connected machinery, and/or any other suitable device or third-party device.

Wired communication modes comprise any mode of communication between points that utilize wired technology including various protocols and combinations of protocols associated with wired transmission, data, and devices. The points comprise, for example, devices such as audio and multimedia devices and equipment, such as audio players and multimedia players, telephones, including mobile telephones and cordless telephones, and computers and computer-related devices and components, such as printers, network-connected machinery, and/or any other suitable device or third-party device. In various implementations, the wired communication modules may communicate in accordance with a number of wired protocols. Examples of wired protocols may comprise Universal Serial Bus (USB) communication, RS-232, RS-422, RS-423, RS-485 serial protocols, FireWire, Ethernet, Fibre Channel, MIDI, ATA, Serial ATA, PCI Express, T-1 (and variants), Industry Standard Architecture (ISA) parallel communication, Small Computer System Interface (SCSI) communication, or Peripheral Component Interconnect (PCI) communication, to name only a few examples.

Accordingly, in various aspects, the communications interface 10 may comprise one or more interfaces such as, for example, a wireless communications interface, a wired communications interface, a network interface, a transmit interface, a receive interface, a media interface, a system interface, a component interface, a switching interface, a chip interface, a controller, and so forth. When implemented by a wireless device or within wireless system, for example, the communications interface 10 may comprise a wireless interface comprising one or more antennas, transmitters, receivers, transceivers, amplifiers, filters, control logic, and so forth.

In various aspects, the communications interface 10 may provide data communications functionality in accordance with a number of protocols. Examples of protocols may comprise various wireless local area network (WLAN) protocols, including the Institute of Electrical and Electronics Engineers (IEEE) 802.xx series of protocols, such as IEEE 802.11a/b/g/n, IEEE 802.16, IEEE 802.20, and so forth. Other examples of wireless protocols may comprise various wireless wide area network (WWAN) protocols, such as GSM cellular radiotelephone system protocols with GPRS, CDMA cellular radiotelephone communication systems with 1xRTT, EDGE systems, EV-DO systems, EV-DV systems, HSDPA systems, and so forth. Further examples of wireless protocols may comprise wireless personal area network (PAN) protocols, such as an Infrared protocol, a protocol from the Bluetooth Special Interest Group (SIG) series of protocols (e.g., Bluetooth Specification versions 5.0, 6, 7, legacy Bluetooth protocols, etc.) as well as one or more Bluetooth Profiles, and so forth. Yet another example of wireless protocols may comprise near-field communication techniques and protocols, such as electro-magnetic induction (EMI) techniques. An example of EMI techniques may comprise passive or active radio-frequency identification (RFID) protocols and devices. Other suitable protocols may comprise Ultra Wide Band (UWB), Digital Office (DO), Digital Home, Trusted Platform Module (TPM), ZigBee, and so forth.

In some embodiments, at least one non-transitory computer-readable storage medium is provided having computer-executable instructions embodied thereon, wherein, when executed by at least one processor, the computer-executable instructions cause the at least one processor to perform embodiments of the methods described herein. This computer-readable storage medium can be embodied in memory subsystem 8.

In some embodiments, the memory subsystem 8 may comprise any machine-readable or computer-readable media capable of storing data, including both volatile/non-volatile memory and removable/non-removable memory. The memory subsystem 8 may comprise at least one non-volatile memory unit. The non-volatile memory unit is capable of storing one or more software programs. The software programs may contain, for example, applications, user data, device data, and/or configuration data, or combinations therefore, to name only a few. The software programs may contain instructions executable by the various components of the system 2.

In various aspects, the memory subsystem 8 may comprise any machine-readable or computer-readable media capable of storing data, including both volatile/non-volatile memory and removable/non-removable memory. For example, memory may comprise read-only memory (ROM), random-access memory (RAM), dynamic RAM (DRAM), Double-Data-Rate DRAM (DDR-RAM), synchronous DRAM (SDRAM), static RAM (SRAM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferro-electric polymer memory), phase-change memory (e.g., ovonic memory), ferroelectric memory, silicon-oxide-nitride-oxide-silicon (SONOS) memory, disk memory (e.g., floppy disk, hard drive, optical disk, magnetic disk), or card (e.g., magnetic card, optical card), or any other type of media suitable for storing information.

In one embodiment, the memory subsystem 8 may contain an instruction set, in the form of a file for executing various methods, such as methods including implementation of trained inference models configured to utilize latent space representations, as described herein. The instruction set may be stored in any acceptable form of machine readable instructions, including source code or various appropriate programming languages. Some examples of programming languages that may be used to store the instruction set comprise, but are not limited to: Java, C, C++, C#, Python, Objective-C, Visual Basic, or .NET programming. In some embodiments a compiler or interpreter is comprised to convert the instruction set into machine executable code for execution by the processing subsystem 4.

Figure 2:
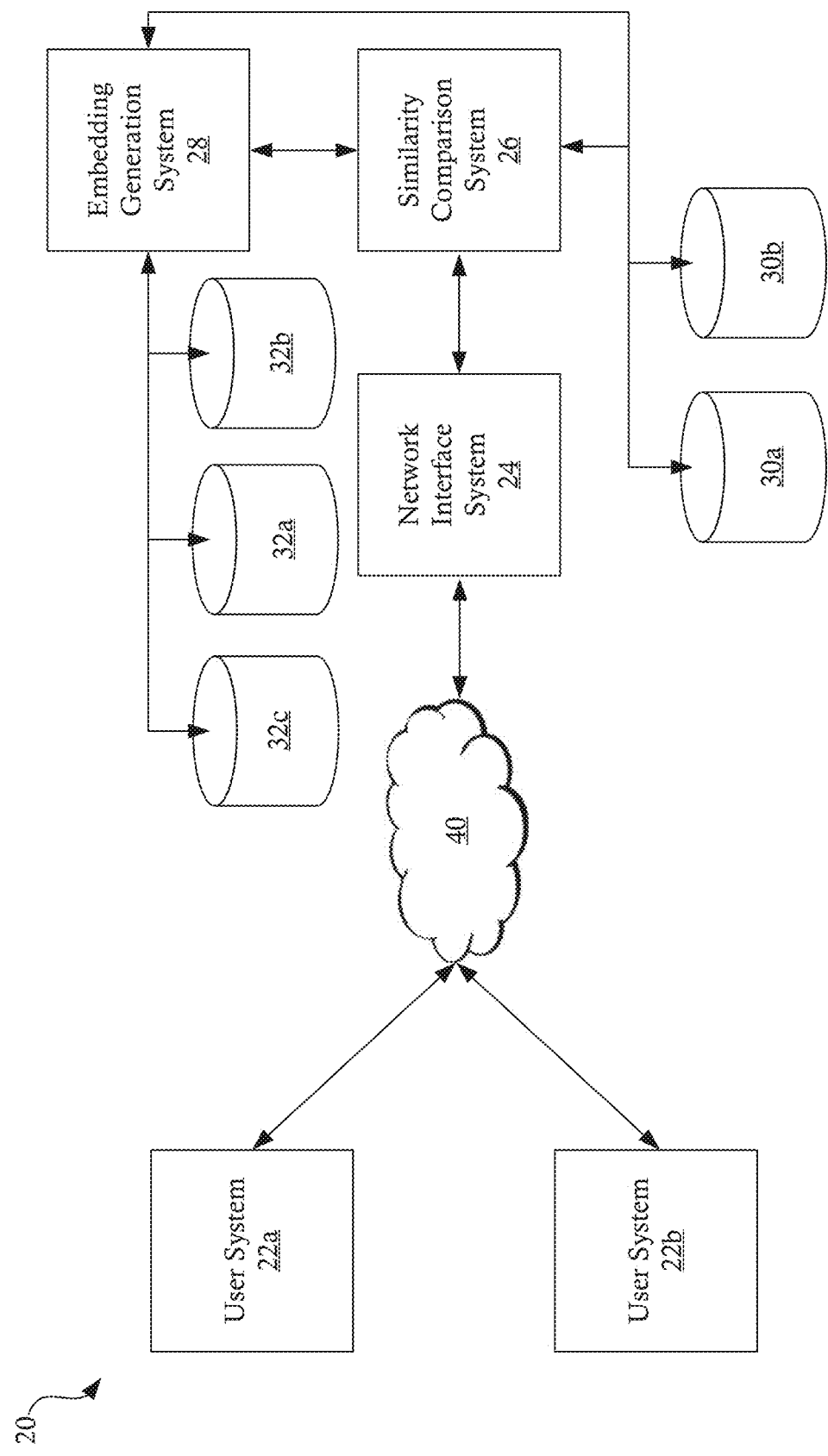
FIG. 2 illustrates a network environment configured to provide personalized recommendations to a user system using a deep joint variational autoencoder model, in accordance with some embodiments.

FIG. 2 illustrates a network environment 20 configured to provide personalized recommendations based at least in part on a trained deep joint variational autoencoder model, in accordance with some embodiments. The network environment 20 may include, but is not limited to, one or more user systems 22a, 22b, a network interface system 24, an item retrieval system 26, a model training system 28, one or more item databases 30, and/or any other suitable system. Each of the systems 22a-28 and/or the databases 30 may include a system as described above with respect to FIG. 1. Although embodiments are illustrates herein having discrete systems, it will be appreciated that one or more of the illustrated systems may be combined into a single system configured to implement the functionality and/or services of each of the combined systems. For example, although embodiments are illustrated and discussed herein including each of a network interface system 24, an item retrieval system 26, and a model training system 28, it will be appreciated that these systems may be combined into a single logical and/or physical system configured to perform the functions and/or provide services associated with each of the individual systems. It will also be appreciated that each of the illustrated systems may be replicated and/or split into multiple systems configured to perform similar functions and/or parts of a function. Each of the systems 22a-28 and/or the databases 30 are in signal communication via one or more intervening network elements, illustrates as network cloud 40.

In some embodiments, the network interface system 24 is configured to provide a network interface to the one or more user systems 22a, 22b. The network interface may include any suitable type of network interface, such as, for example, an e-commerce interface, a search interface, an inventory interface, etc. Although embodiments are discussed herein with reference to an e-commerce network interface, it will be appreciated that the disclosed systems and methods are applicable to any interface including sets of items that may be retrieved based on search queries and rankings.

In some embodiments, a user system 22a, 22b interacts with a network interface provided by the network interface system 24. The network interface may be any suitable interface. For example, in some embodiments, the network interface is an e-commerce interface configured to present one or more products, product pages, descriptions, etc. to enable a user to view and purchase items. In some embodiments, the network interface 24 is configured to provide recommended items and/or categories of items to a user system 22a, 22b based on prior interactions between the network interface system 24 and a user associated with the user system 22a, 22b. As discussed in greater detail below, the recommended items/categories may be selected by a trained selection model configured to utilize latent space representations of a feature set. In some embodiments, interaction data is stored in database 30.

In some embodiments, the network interface system 24 receives a set, or list, of recommended items for a specific user system 22a, 22b from an item recommendation system 26. The item recommendation system 26 generates the set of recommended items based on a trained inference model. The trained inference model includes a deep joint variational encoder architecture, as discussed in greater detail below. In some embodiments, the item recommendation system 26 is configured to retrieve a set of candidate items and generate a set of recommended items from the set of candidate items. For example, in some embodiments, the item recommendation system 26 utilizes a trained inference model to identify a set of recommended items from a pool of potential items, e.g., the set of candidate items. As discussed in greater detail below, in some embodiments, the identification of recommended items is performed by a trained inference model based on latent space representations.

In some embodiments, the item recommendation system 26 is in signal (e.g., data) communication with one or more item databases 30 containing a representation for each item in the pool of items. In some embodiments, the item recommendation system 26 is configured calculate ranking scores for each item in the pool. In some embodiments, representations in the item database 30 may be sorted by predefined categories, geographic areas, etc. and the comparison process may use only one or more of the predefined categories.

In some embodiments, the item recommendation system 26 is in signal (e.g., data) communication with a model training system 28. The model training system 28 may be configured to generate a trained inference model by training an untrained or previously trained inference model using a training data set. For example, in some embodiments, the model training system 28 is configured to generate a trained inference model using an untrained machine learning model. It will be appreciated that the specific machine learning model used may be any suitable machine learning model.

In some embodiments, the model training system 28 is configured to generate a trained inference model and provide the trained inference model to the item recommendation system 26 and/or a production environment for use in item recommendation tasks. In other embodiments, the trained inference model may be implemented directly on the model training system 28 and/or any other system and accessed by the item recommendation system 26 using one or more network connections. The trained prediction model may be updated by replacing the current trained prediction model with a new trained prediction model generated by the prediction model generation system 28 at a predetermined interval, such as, for example, bi-monthly, monthly, weekly, etc. As discussed below, each trained prediction model is generated, to utilize latent space representations of a feature set. It will be appreciated that any suitable network or system architecture may be used to implement the disclosed systems and methods.

Figure 3:
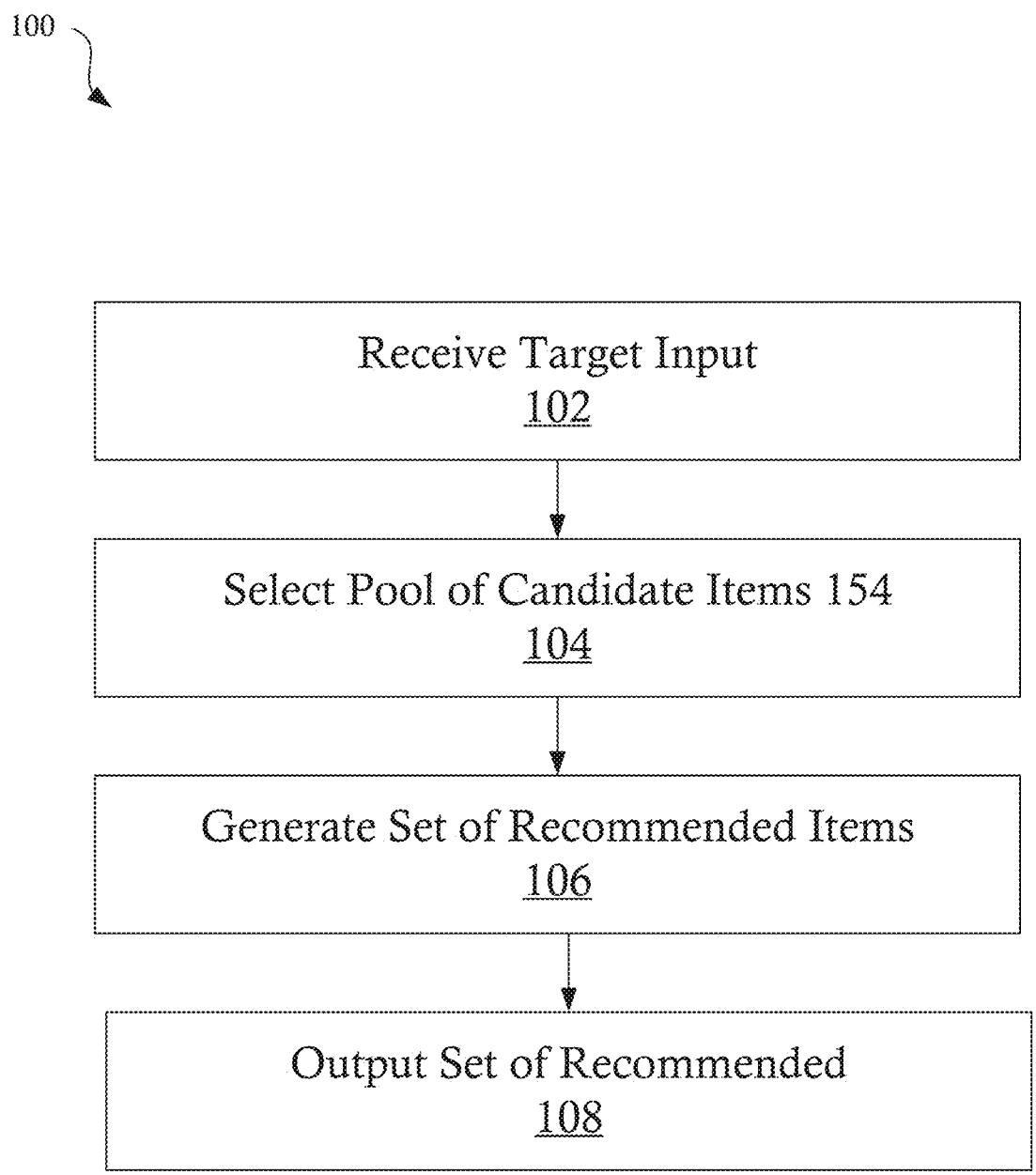
FIG. 3 is a flowchart illustrating a method of selecting content from a pool using a trained inference model, in accordance with some embodiments.
Figure 4:
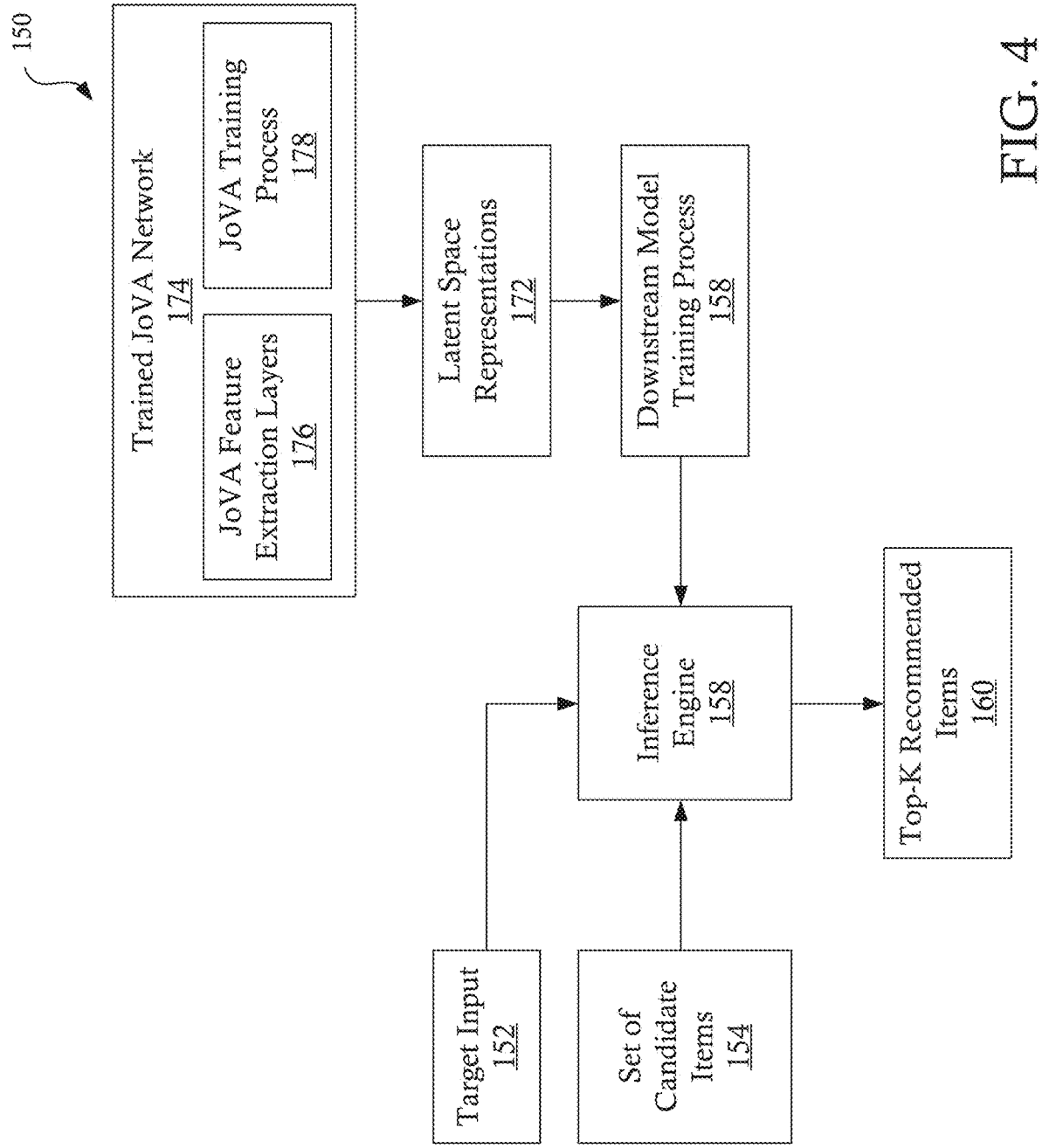
FIG. 4 is a process flow illustrating various steps of the method of selecting content from a pool using a trained inference model illustrated in FIG. 3, in accordance with some embodiments.

FIG. 3 is a flowchart illustrating a method 100 of selecting content from a pool using a trained inference model, in accordance with some embodiments. FIG. 4 is a process flow 150 illustrating various steps of the method 100 of selecting content from a pool using a trained inference model illustrated in FIG. 3, in accordance with some embodiments. At step 102, a target input 152 is received. The target input may include any suitable target input 152, such as, for example, a user identifier, a target string, a target item, etc. The target input 152 may be received from any suitable system, such as, for example, a user system 22a, 22b. In some embodiments, the target input 152 includes an alphanumeric string, such as, for example, a search query, an item identifier, a stock-keeping unit (SKU), and/or any other suitable alphanumeric string. In some embodiments, the target input 152 includes a beacon response, cookie identifier, and/or other unique user identifier. Although specific embodiments are discussed herein, it will be appreciated that any suitable target input may be used.

In some embodiments, the target input 152 includes a set of prior user interactions (or impressions) with one or more systems (such as aa network interface system 24). User interactions may include, but are not limited to, user item interactions such as an item view (e.g., user seeing an item in search results, recommended items, ad, etc.), item click-through (e.g., user clicking on link to go to product-specific information), item add-to-cart (e.g., user adding the product to a virtual cart for future purchase), item purchase (user ordering the item), etc. User interactions may also include, but are not limited to, user specified or derived information such as user preferences (color preference, brand preference, etc. of the specific user), aggregated information, anonymized information, and/or any other suitable user interactions.

In some embodiments, the target input 152 may be received from a database configured to maintain prior interaction data, such as, for example, database 30. The set of prior system interactions 152 may be obtained from file system data, such as, for example, log data. The log data may be generated and/or maintained by any suitable system, such as the network interface system 24. In some embodiments, log data is maintained for each user.

At optional step 104, a set of candidate items 154 is selected from a pool of items 156. In some embodiments, the set of candidate items 154 are selected based on, for example, a basic comparison between the target input and the items in the pool of items. It will be appreciated that any suitable search algorithm or process may be used to select the set of candidate items 154 from the pool of items 156.

The pool of items 156 may be stored in a database, such as database 30 discussed above. The initial search and selection of the set of candidate items may be performed by an item inference model 158, a search engine, other query system. In some embodiments, step 104 is skipped and the set of candidate items 154 is the same as the pool of items 156.

At optional step 106, the target input 152 may be preprocessed. The preprocessing may be performed by any suitable mechanism, such as, for example, a preprocessing element implemented by the prediction model training system 28, although it will be appreciated that preprocessing may be performed by any suitable system and the set of prior system interactions 152 may be processed prior to being stored in and/or after being retrieved from a storage mechanism, such as the database 30. In some embodiments, preprocessing includes limiting a set of prior system interactions to user sets having at least a predetermined number of interactions or a maximum number of interactions, user sets having at least one interaction within a predetermined time period, interactions within a predetermined category, and/or otherwise limited. For example, in various embodiments, a target input 152 including a set of prior interactions 152 may be limited to the last N interactions (where N is any integer greater than 1), limited to users having at least N interactions (e.g., 5, 10, 15, etc.), limited to products having at least N user interactions (e.g., 3, 4, 5, 6, etc.), and/or limited using any other suitable criteria. In some embodiments, the set of prior interactions is split into multiple sets, including, for example, a training set, a validation set, a test set, etc. Preprocessing may further include, but is not limited to, normalization of the item/product interactions and/or time values.

At step 108, the target input 152 (and optionally the set of candidate items 154) are provided to a trained inference model 158 configured to generate a set of recommended items 160. The trained inference model 158 may be implemented by one or more systems, such as the item retrieval system 26. In some embodiments, the candidate item selection process executed at step 104 and the trained inference model 158 may be implemented by the same system and/or by different systems.

In some embodiments, the trained inference model 158 is configured to utilize latent space representations of prior user interactions to select recommended items 160 from the set of candidate items 154. As discussed in greater detail below, the latent space representations are configured to incorporate implicit feedback, such as feedback derived from both interactions (e.g., a user has interacted with an item in the pool previously) and non-interactions (e.g., a user has not interacted with an item in the pool previously). In some embodiments, interactions between a set of users $u_i$ and a set of items $i_j$ may be represented as a matrix. If a user has interacted with an item, the matrix may have a value of 1 for the user/item intersection and if a user has not interacted with an item, the matrix may a value of 0 for the user/item intersection. For example, in some embodiments, a matrix representing interactions between a set of three users and a set of four items may be represented as:

|       | $I_1$ | $I_2$ | $I_3$ | $I_4$ |
|-------|-------|-------|-------|-------|
| $U_1$ | 1     | 0     | 1     | 1     |
| $U_2$ | 0     | 0     | 0     | 1     |
| $U_3$ | 0     | 1     | 1     | 1     |

Although embodiments are illustrated herein using a binary matrix (e.g., a matrix having values of 0 or 1) it will be appreciated that any suitable matrix values may be used to represent user and item interactions. Rows may be extracted from the matrix to provide sets representing a specific user's $u_i$ interactions with all items in the set of items 154 and columns may be extracted to provide sets representing a specific item's $i_j$ interactions across the set of users in a dataset.

In some embodiments, the trained inference model 158 is configured to utilize learnt latent space representations to generate item recommendations. For example, in some embodiments, the trained inference model 158 is configured to compare a latent space representation of a user query to latent space representations of items in a pool of candidate items 154 to generate a set of recommended items 160. The latent space representations are generated based on prior interactions of the user and represent a likelihood of the user interacting with certain items in the pool of candidate items 154. In some embodiments, the latent space representations are generated using a deep joint variational autoencoder process, as discussed in greater detail below. The deep joint variational autoencoder process generates latent space representations that capture non-linear relationships between users and items, identifies diverse user preferences, and provides increased performance on sparse datasets as compared to traditional methods.

In some embodiments, the item inference model 158 includes an inference engine generated by a downstream model training process 170 configured to train an item inference model, such as an embedding comparison model, using latent space embeddings generated by a deep joint variational autoencoder network 172. The trained inference engine may include any suitable inference model. Item recommendation systems and methods are described, for example, in U.S. patent application Ser. No. 17/163,383, filed on Jan. 30, 2021, entitled "Composite Embedding Systems and Methods for Multi-Level Granularity Similarity Relevance Scoring," the disclosure of which is incorporated by reference herein in its entirety.

Figure 5:
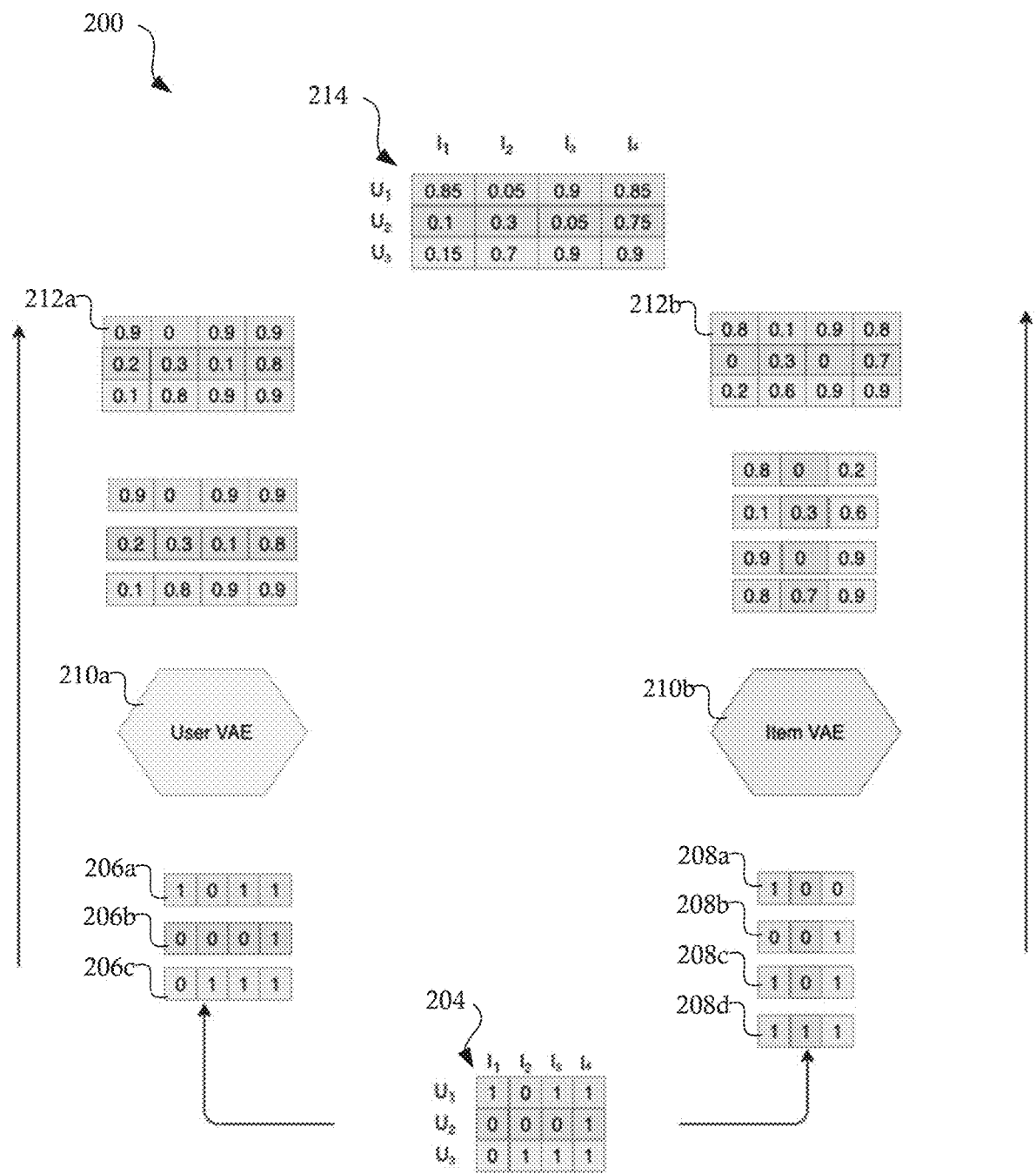
FIG. 5 illustrates one embodiment of a deep joint variational autoencoder network configured to use at least two joint variational autoencoder processes to simultaneously capture user-user and item-item correlations, in accordance with some embodiments.

FIG. 5 illustrates one embodiment of a deep joint variational autoencoder network 200 configured to use at least two joint variational autoencoder processes 202a, 202b to simultaneously capture user-user and item-item correlations, in accordance with some embodiments. An input matrix 204 is received as an input to the deep joint variational network 200. Each row in the input matrix 204 is extracted as a user input 206a-206c and each column in the input matrix 204 is extracted as an item input 208a-208d.

The user inputs 206a-206c are provided to a user variational autoencoder 210a configured to generate probability distributions based on user-user similarities. Simultaneously, the item inputs 208a-208d are provided to an item variational autoencoder 210b configured to generate probability distributions based on item-item similarities. The user variational autoencoder 210a and the item variational autoencoder 210b are implemented independently.

Sampling is performed to obtain values within each of the generated distributions to generate a user output matrix 212a having similar values to those of the user inputs 206a-206c and an item output matrix 212b having similar values to those of the item inputs 208a-208d. Although the output matrices 212a, 212b are similar to the inputs 206a-206c, 208a-208d, the output matrices 212a, 212b can include estimated values for user-item interactions that have not actually occurred. For example, even if a user has not interacted with a certain item, the generated output matrices 212a, 212b can include an estimated likelihood that a user $u_i$ will interact with an item $i_j$.

The output matrices 212a, 212b may be combined to generate a final output matrix 214. In the illustrated embodiment, the final output matrix 214 is generated by averaging the values in the corresponding cells of the user output matrix 212a and the item output matrix 212b. Although embodiments are discussed herein including average values, it will be appreciated that the output matrices 212a, 212b may be combined to generate a final output matrix 214 using any suitable combination, such as, for example, any suitable weighted and/or unweighted combination.

In some embodiments, the joint variational autoencoder network 200 is configured to operate on implicit data (e.g., user/item interactions and non-interactions) to generate user and item representations for the top-k recommendation tasks (e.g., for recommending a set of top-k items). The joint variational autoencoder network 200 is configured to capture user-brand interaction pattern and generate embeddings that provide better implicit understanding of the user and brand space and the non-trivial relations between entities within that space. In some embodiments, the joint variational autoencoder network 200 is configured to improve upon existing collaborative filtering based approaches for generating user and brand embeddings. Examples of collaborative filtering processes are described in U.S. Provisional Patent Application Ser. No. 63/264,925, entitled "Systems and Methods for Determining Temporal Loyalty," filed Dec. 3, 2021, which is incorporated by reference herein in its entirety.

Figure 6:
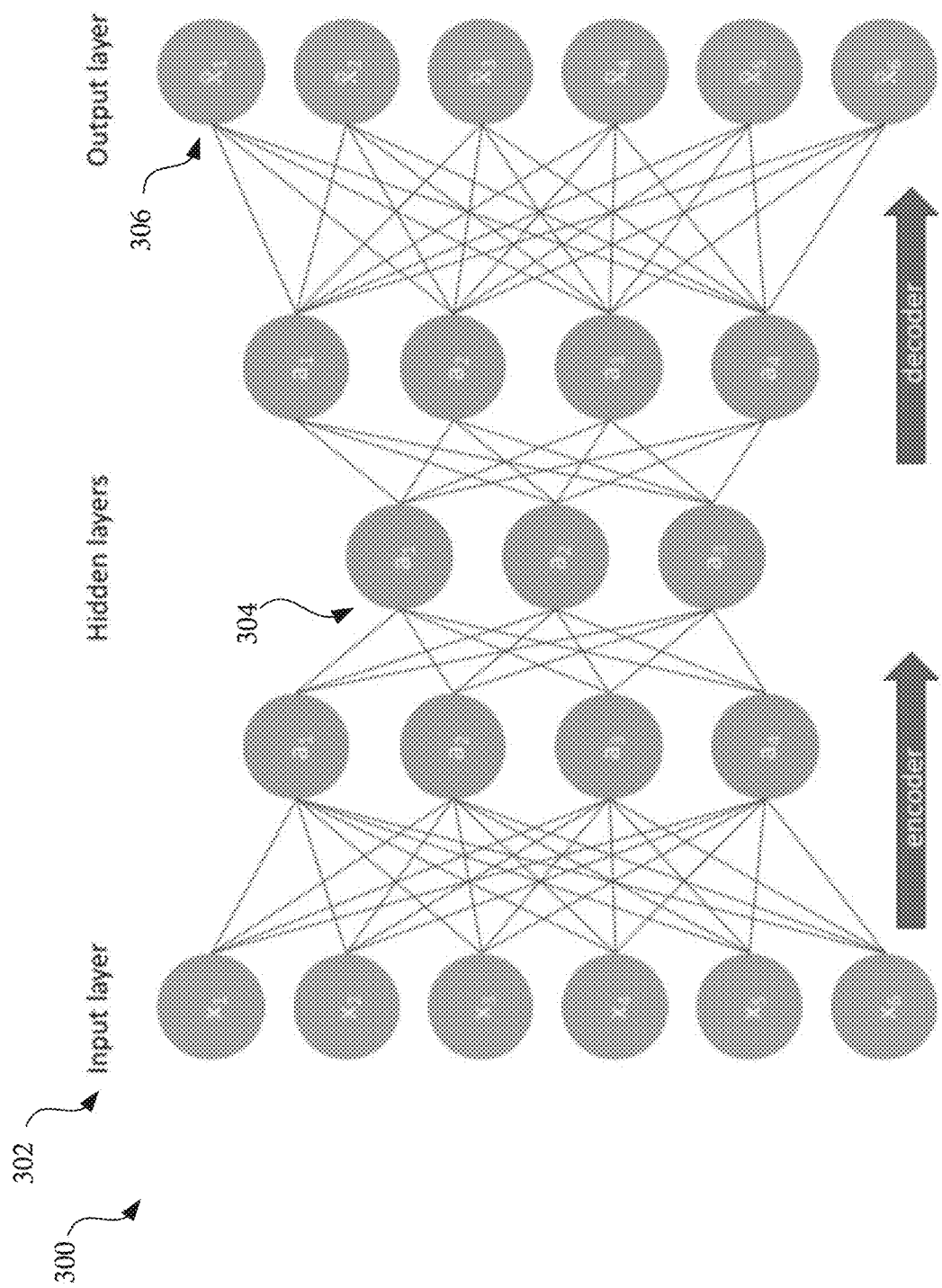
FIG. 6 illustrates an autoencoder model configured to generate latent space representations having discrete values, in accordance with some embodiments.

FIG. 6 illustrates an autoencoder model 300 configured to generate latent space representations having discrete values, in accordance with some embodiments. In some embodiments, the autoencoder model 300 includes an encoder portion 302, a latent space representation (or vector) 304, and a decoder portion 306. The encoder portion 302 is configured to receive an input, such as, for example, an interaction matrix (e.g., matrix 204 illustrated in FIG. 5) and/or a portion of an interaction matrix. The encoder portion 302 converts the received input into a latent space representation 304. Similarly, the decoder portion 306 is configured to receive the latent space representation 304 and generate an output substantially equivalent to the input (e.g., the extracted row or column of an interaction matrix).

In some embodiments, the latent space representation 304 includes a vector representative of the input received at the input layer 302. The latent space representation 304 may be extracted (e.g., by truncating the autoencoder model 300 to remove the decoder portion 306). The autoencoder model 300 describes observations in latent space in a deterministic manner (e.g., discrete values). The autoencoder model 300 may be configured to generate a latent space representation 304 having multiple dimensions representing different learned attributes for a specific data set. In some embodiments, a deep joint variational autoencoder is used to convert input samples into encoding vectors having multiple probabilistic dimensions, as discussed below.

Figure 7:
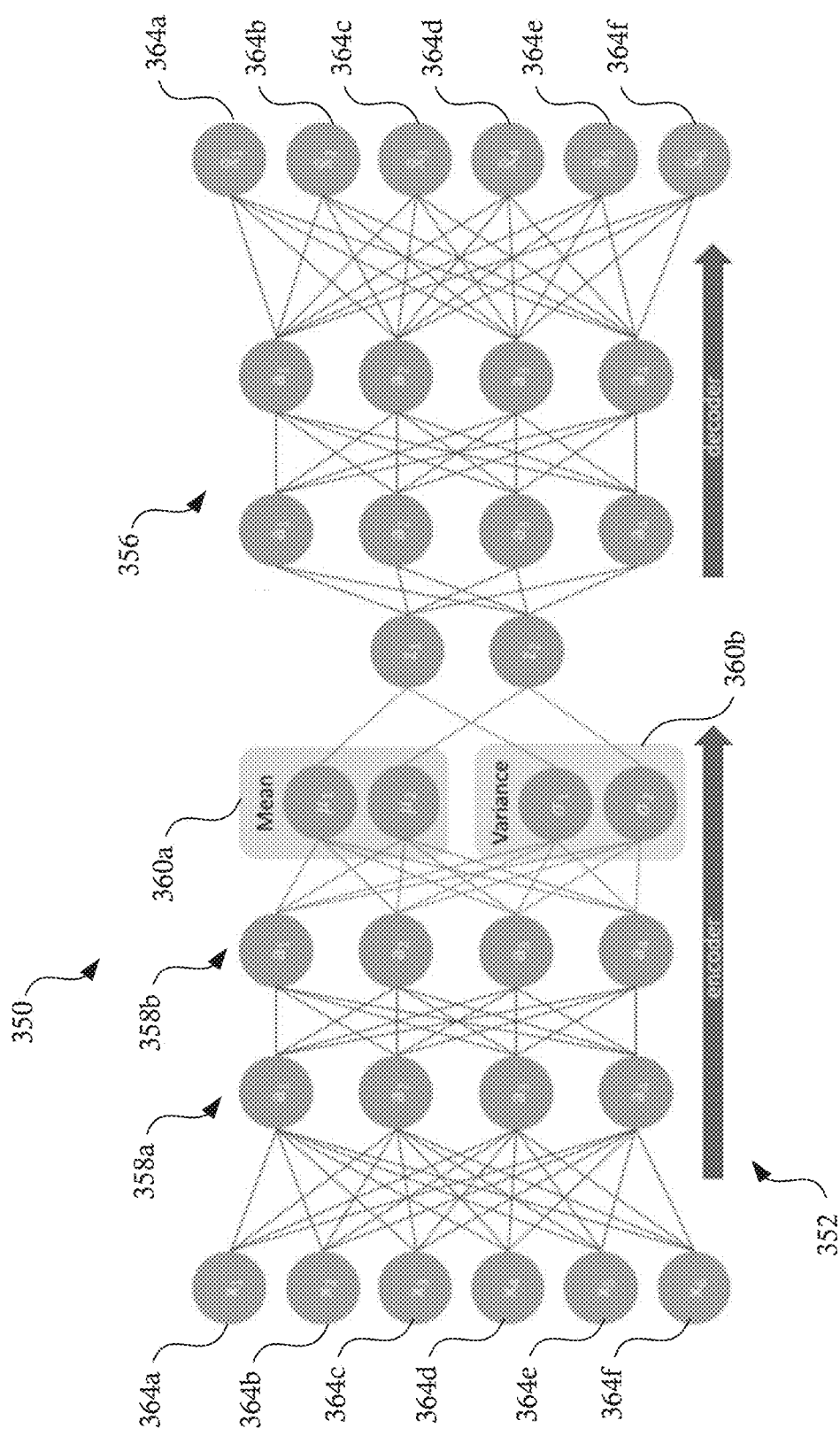
FIG. 7 illustrates a variational autoencoder model, in accordance with some embodiments.

FIG. 7 illustrates a variational autoencoder model 350 ("VA model 350"), in accordance with some embodiments. The VA model 350 is similar to the autoencoder model 300 described above, and similar description is not repeated herein. The VA model 350 includes an encoder portion 352 configured to generate vectors having a single value for each of a plurality of encoding dimensions learnt by the VA model 350.

The encoder portion 352 of the VA model 350 includes multiple hidden encoding layers 358a, 358b configured to generate latent state representations 360a, 360b (collectively "latent space representations 360") including a plurality of latent state distributions. The latent state representations 360a, 360b include probability distributions defined by, for example, mean, variance, and/or other values. In some embodiments, sample distributions 364 are obtained from the latent state representations 360a-360b and provided to a decoder portion 356 configured to generate output values 370a-370f, which are expected to be accurate reconstructions of the input values 364a-364f.

The latent space representations 304, 360 generated by the autoencoder model 300 and/or the VA model 350 may be used by a second model, such as a trained inference model 158, to perform personalized item recommendation, personalized search, and/or any other suitable item recommendation and/or personalization process.

Figure 8:
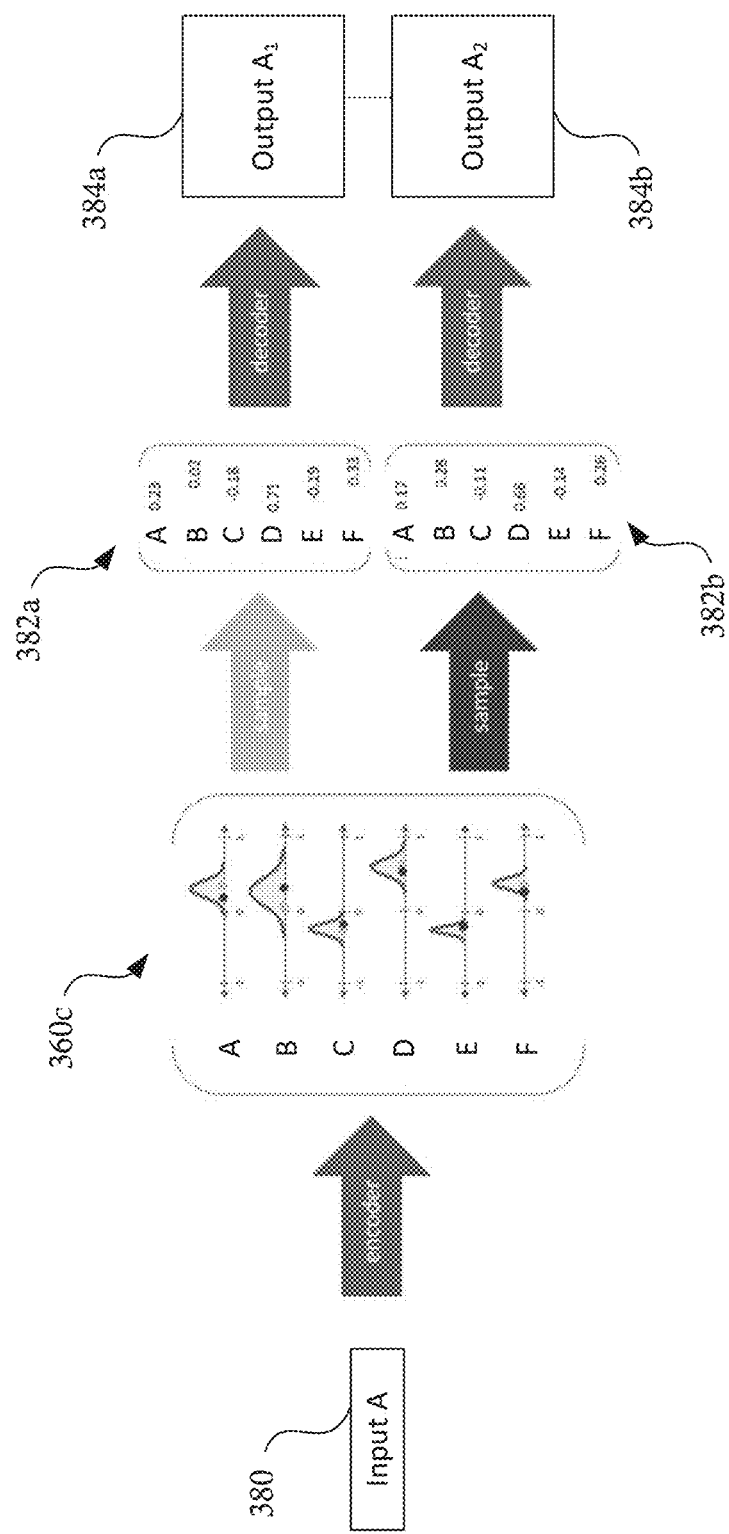
FIG. 8 illustrates a process of encoding/decoding a given input sample, in accordance with some embodiments.

FIG. 8 illustrates a process of encoding/decoding a given input sample 380, in accordance with some embodiments. The input sample 380 is received by the encoding portion of a VA model, such as the encoding portion 352 of the VA model 350. The encoding portion 352 generates a latent state representation 360c including a set of latent state probabilities representing probabilistic ranges for a set of attributes (or dimensions) that have been learned for the dataset. In the illustrated embodiment, the latent space representation 360c includes six latent state probabilities, although it will be appreciated that any suitable number of latent state probabilities may be generated by an encoder portion of a VA model.

Sample sets 382a, 382b are obtained from the latent state probability distributions and are provided to the decoder portion, such as decoder portion 356, which generates a set of output values 384a, 384b. The set of output values 384a, 384b are expected to be substantially similar to the input value 380 (i.e., the decoder portion 352 is configured to provide an accurate reconstruction from any sample from the latent state distributions). Because sampling generates similar latent state probability distributions, it is possible to generate latent state representations 360 for item and user pairs lacking data based on similar sample values from item and user pairs having similar distributions.

In some embodiments, variational inference may be performed to generate distribution likelihoods for hidden variables to generate latent space representations. The variational inference may be performed to maximize generation of the distribution likelihoods. For example, in some embodiments, a set of observable data x is provided and is related to a set of hidden variables z, where:

$$x = \{x_1, x_2, \ldots, x_n\}$$

$$z = \{z_1, z_2, \ldots, z_n\}$$

The probability of a hidden value z, given a value x, is represented by:

$$p_\phi(z|x) = \frac{p(x|z)p(z)}{p(x)}$$

where p(z|x) is the posterior distribution and p(z) is a prior distribution. This equation can be rewritten to provide the distribution p(x):

$$p(x) = \int p(x|z)p(z)dz$$

The distribution p(z|x) is intractable, e.g., cannot be solved. However, the distribution p(z|x) can be approximated as:

$$\min KL(q(z|x) \| p(z|x))$$

where KL (Kullback-Leibler) divergence is a measure of two distributions, the distribution p(z|x) and a second distribution q(z|x) which is defined such that it has a tractable distribution. The parameters of q(z|x) are defined similar to p(z|x) such that q(z|x) may be used to perform an approximate inference of the intractable distribution p(z|x). In order to ensure p(z|x) and q(z|x) are similar, the KL divergence is minimized. In some embodiments, q(z|x) may be determined as:

$$q_\phi(z|x) = \mathcal{N}(\mu_\phi(x), \sigma_\phi^2(x)I)$$

where the two multivariate functions $\mu_\phi(x)$ and $\sigma_\phi^2(x)$ map the input x to the mean and standard deviation vectors. The KL divergence may be minimized by maximizing:

$$E_{q(z|x)} \log p(x|z) - KL(q(z|x) \| p(z))$$

wherein $E_{q(z|x)} \log p(x|z)$ represents the reconstruction likelihood for the variational autoencoder system and KL(q(z|x)‖p(z)) provides that a learned distribution q is similar to the true prior distribution p. A loss function, L, can be represented as:

$$L_{VAE}(x|\theta) = -E_{q\phi(Z|X)}[\log p_\psi(x|z)] + KL(q_\phi(z|x) \| p(z))$$

where $\theta = [\psi, \phi]$. A regularization parameter, $\alpha$, may be introduced such that:

$$L_{VAE}(x \mid \theta, \alpha) = -E_{q\phi(Z|X)}[\log p_\psi(x \mid z)] + \alpha KL(q_\phi(z \mid x) \| p(z))$$

where:

$$\log p_\psi(x \mid z) = \sum_i x_i \log \sigma(o_i) + (1 - x_i)(1 - \sigma(o_i))$$

where:

$$\sigma(x) = \frac{1}{(1 + \exp(-x))}$$

is the logistic function. By minimizing the differences between the distributions with respect to item-item and user-user similarities, the KL divergence can be used to determine the likelihood a user $u_i$ will interact with an item $i_j$.

With reference again to FIGS. 3 and 4, at step 110, a set of top-k recommended items 160 is selected by the trained inference model 158. The set of top-k recommended items 160 includes items ranked from, for example, highest to lowest, based on the likelihood of a user interacting with a specific item, such as illustrated in the output matrix 214 illustrated in FIG. 5. The top-k recommended items may be generated by the inference model 158 using any suitable process, such as, for example, an embedding comparison process as known in the art.

At step 110, the set of ranked items 160 is provided to additional systems and/or processes of a search backend. The additional systems and/or processes are configured to select a subset of the set of ranked items 160 for presentation to a user in response to the user's search query. Any suitable additional selection processes and/or criteria may be applied to the set of ranked items 160 to selected items for presentation to a user.

Figure 9:
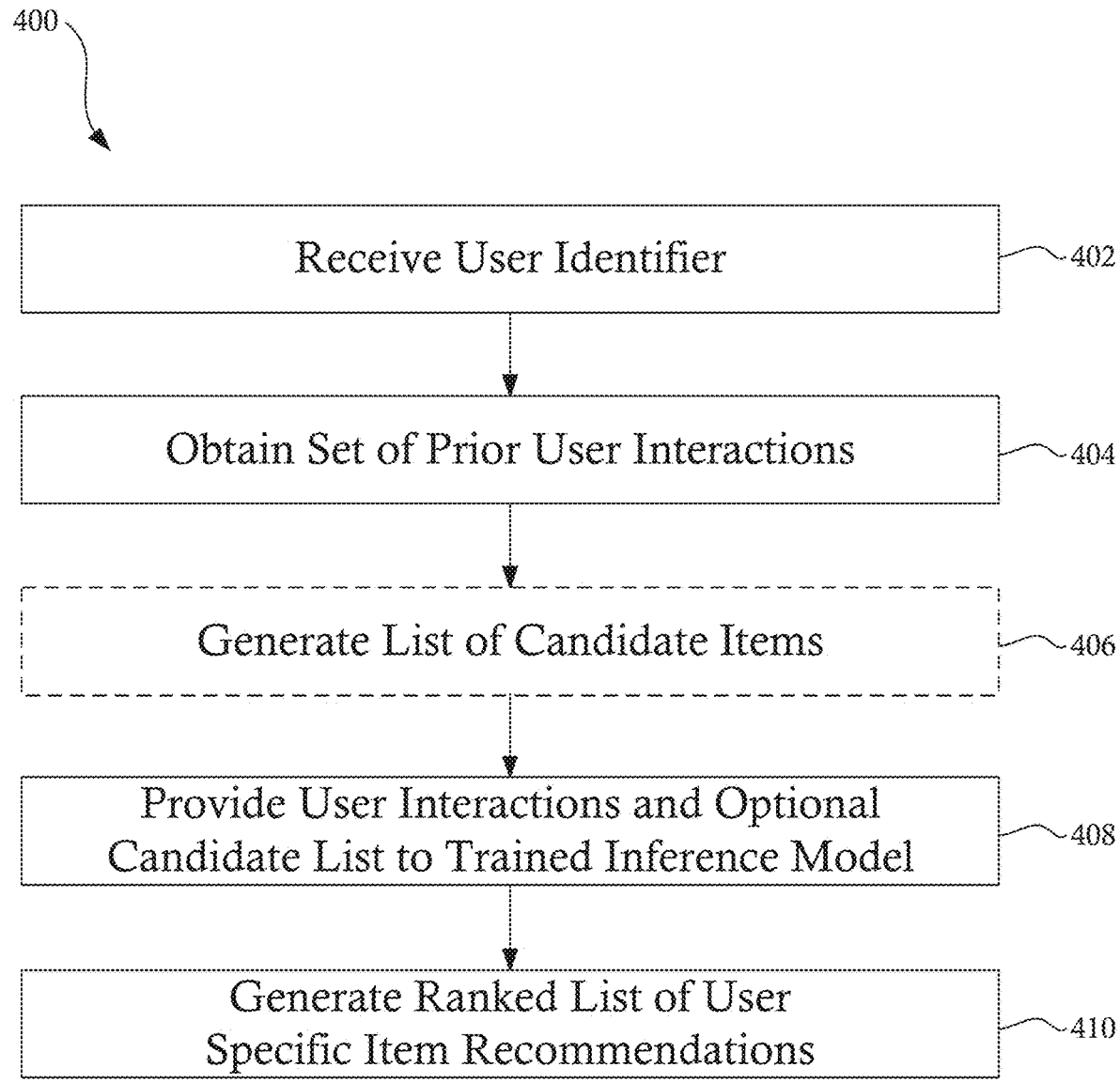
FIG. 9 is a flowchart illustrating a method of generating user-specific predictions in a network interface environment, in accordance with some embodiments.
Figure 10:
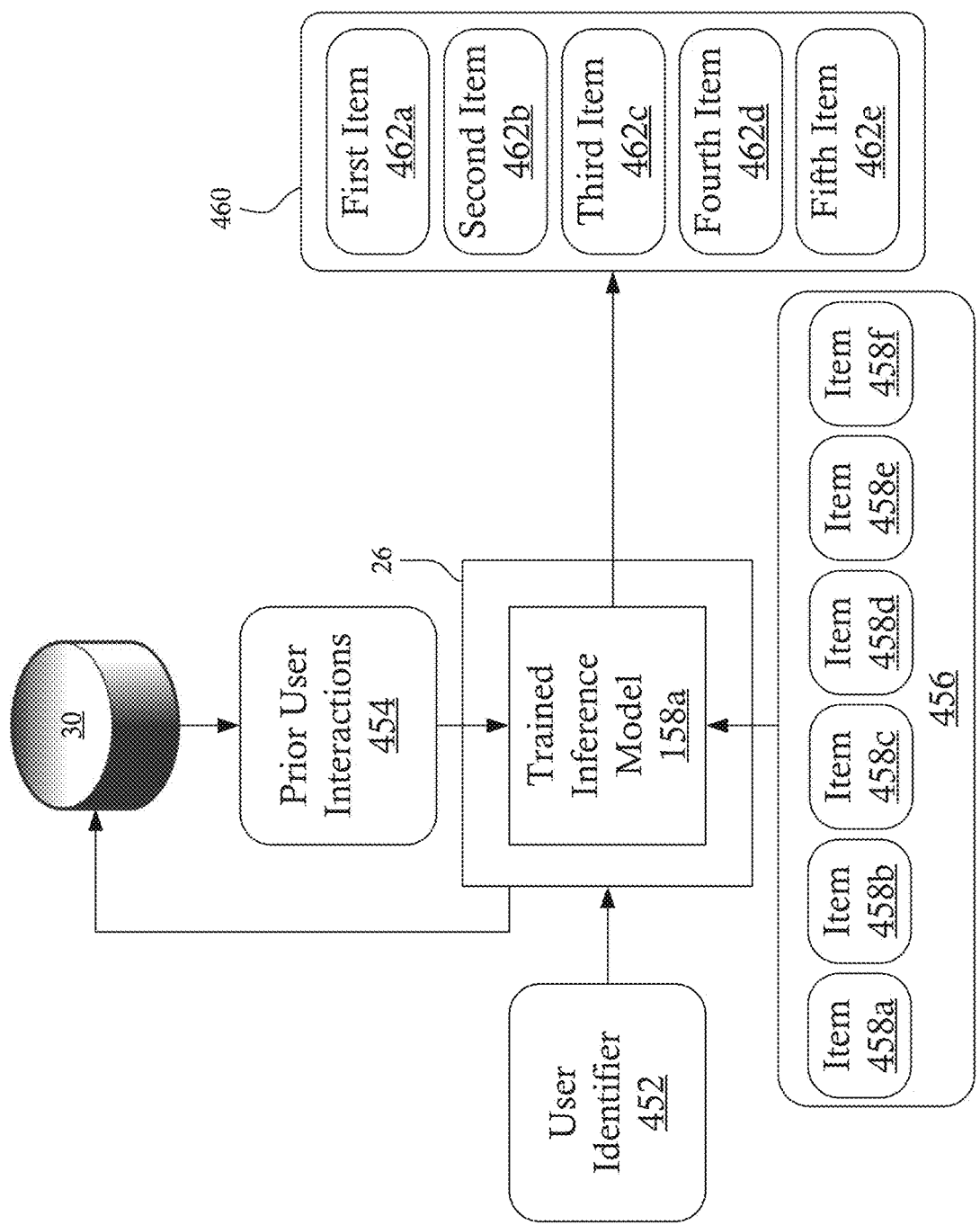
FIG. 10 is a process flow illustrating various steps of the method of FIG. 9, in accordance with some embodiments.

FIG. 9 is a flowchart illustrating a method 400 of generating user-specific predictions in a network interface environment, in accordance with some embodiments. FIG. 10 is a process flow 450 illustrating various steps of the method 400, in accordance with some embodiments. At step 402, a user identifier 452 is received by a suitable system, such as a network interface system 24 and/or an item recommendation system 26. The user identifier 452 may be received, for example, from a user system 22a, 22b. The user identifier 452 may include any suitable identifier, such as, for example, a cookie, a beacon, a user log-in, an IP address, and/or any other suitable user identifier. In some embodiments, the user identifier 452 may be received by the network interface system 24 and subsequently provided to one or more other systems by the network interface system 24, such as, for example, the item recommendation system 26.

At step 404, a set of prior user interactions 454 associated with the user identifier 452 are received by a suitable system, such as the item recommendation system 26. The set of prior user interactions 454 includes a plurality of product interactions and time values for each product interaction for a specific user associated with the user identifier 452. The product interactions may include, but are not limited to, item searches, add-to-cart interactions, product views, product purchases, user specific preferences, and/or any other suitable interaction. The set of prior user interactions 454 may be maintained by any suitable storage mechanism, such as an interaction database 32. The set of prior user interactions 454 may be stored and/or retrieved in any suitable form, such as, for example, log files maintained by one or more systems within network 20, such as, for example, the network interface system 24. Although specific embodiments are discussed herein, it will be appreciated that any suitable data structure, format, location, etc. may be used to store prior user interactions.

At optional step 406, the item recommendation system 26 generates and/or receives a set of candidate items 456. The set of candidate items 456 may include one or more items 458a-458f previously identified and/or selected for one or more items (or products) included in the set of prior user interactions 454. For example, in various embodiments, the set of candidate items 456 may include items 458a-458f that are frequently purchased with, in the same category as, made by the same manufacturer as, and/or otherwise associated with a product in the set of prior user interactions 454 (e.g., complimentary items). The set of candidate items 456 may be generated using any suitable method, such as, for example, a trained neural network, clustering, and/or any other suitable mechanism. In some embodiments, the set of candidate items 456 may include latent space representations of the items generated using a trained inference model, such as the inference model 158 discussed above with respect to FIGS. 3-4.

At step 408, the set of prior user interactions 454 and the optional set of candidate items 456 are provided to a trained inference model 158a. The trained inference model 158a may be maintained by any suitable system, such as, for example, the item recommendation system 26. The trained inference model 158a is configured to generate item recommendations based on latent space representations of prior user interactions and/or candidate items, for example, according to the method 100 discussed above in conjunction with FIGS. 3-4. The trained inference model 158a may be retrieved from a production environment and implemented on one or more systems within a computing cluster.

At step 410, the trained inference model 158a generates personalized item recommendations 460. The personalized item recommendations 460 includes a set of ranked items 462a-462e corresponding to user interests based on various user interactions represented using latent space representations. For example, in some embodiments, the trained inference model 158a includes a neural network structure configured to compare latent space representations of items within the set of candidate items 456 to latent space representations of prior user interactions with the network interface system 24. The trained inference model 158a captures intricate user relationships in a brand space and helps to capture a brand space, for example, by defining "similar" brands, "complementary" brands, etc. The generation of latent space representations using a deep learning based variational autoencoder process allows the disclosed systems and methods to derive non-obvious features from raw signals. In some embodiments, the set of ranked items 462a-462e includes items selected from the set of complimentary items 458a-458f. In other embodiments, the set of ranked items 462a-462e are selected and ranked by the trained inference model 158a from a set of all available items. The personalized item recommendations 460 may be provided to the network interface system 24 for presentation to a corresponding user system 22a, 22b.

The disclosed systems and methods for top-k item recommendation based on latent space representations provides an improvement over both manual feature selection processes and standard deep learning-based recommendations. The disclosed systems and methods enhance user experience by using latent space representations of users and attributes to identify relevant item recommendations. The user of latent space representations, as disclosed herein, captures intricate user relationships in a brand space and helps to capture a brand space, for example, by defining "similar" brands, "complementary" brands, etc. The generation of latent space representations using a deep learning based variational autoencoder process allows the disclosed systems and methods to derive non-obvious features from raw signals.

The disclosed systems and methods utilizing joint variational autoencoders provides end-to-end embedding generation and evaluation systems that jointly generate user and brand embeddings. The disclosed systems and methods improve both precision of recommendations and cold-start recommendation processes by generating embeddings for brands which do not have any prior interaction data.

Although the subject matter has been described in terms of exemplary embodiments, it is not limited thereto. Rather, the appended claims should be construed broadly, to include other variants and embodiments, which may be made by those skilled in the art.

What is claimed is:

1. A system, comprising:
a processor; and
a non-transitory memory storing instructions, that when executed, cause the processor to:
receive a user identifier corresponding to a set of prior interactions;
generate a set of candidate items;
generate a set of latent space representations of the set of prior interactions and the candidate items using a trained inference model, wherein the trained inference model generates distribution likelihoods for hidden variables and includes a joint variational autoencoder model;
generate a set of k-recommended items based on a comparison of the set of latent space representations of the set of prior interactions and the set of latent space representations of the candidate items;
rank the set of k-recommended items based on the candidate items and a set of all available items; and
generate a user interface including the ranked set of k-recommended items.

2. The system of claim 1, wherein the joint variational autoencoder model comprises a user variational autoencoder model and an item variational autoencoder model.

3. The system of claim 2, wherein each latent space representation in the set of latent space representations of the set of prior interactions is generated by combining a first user-item value generated by the user variational autoencoder model and a second user-item value generated by the item variational autoencoder model.

4. The system of claim 3, wherein each latent space representation in the set of latent space representations is an average value of the first user-item value and the second user-item.

5. The system of claim 1, wherein the trained inference model is configured to generate a plurality of probability distributions for a set of features identified during training of the joint variational autoencoder model.

6. The system of claim 1, wherein the joint variational autoencoder is configured to estimate a probability distribution according to $$\min \mathrm{KL}(q(z|x) \| p(z|x))$$

where KL is Kullback-Leibler divergence, $p(z|x)$ is an intractable distribution, and $q(z|x)$ is a tractable distribution.

7. The system of claim 1, wherein the set of latent space representations of one or more items is generated by a second joint variational autoencoder model prior to receiving the user identifier.

8. A non-transitory computer readable medium having instructions stored thereon, wherein the instructions, when executed by a processor cause a device to perform operations comprising:
receiving a user identifier corresponding to a set of prior interactions;
generating a set of candidate items;
generating a set of latent space representations of the set of prior interactions and the candidate items using a trained inference model, wherein the trained inference model generates distribution likelihoods for hidden variables and includes a joint variational autoencoder model;
generating a set of k-recommended items based on a comparison of the set of latent space representations of the set of prior interactions and the set of latent space representations of the candidate items;
ranking the set of k-recommended items based on the candidate items and a set of all available items; and
generating a user interface including the ranked set of k-recommended items.

9. The non-transitory computer readable medium of claim 8, wherein the joint variational autoencoder model comprises a user variational autoencoder model and an item variational autoencoder model.

10. The non-transitory computer readable medium of claim 9, wherein the one or more latent space representations of the set of prior interactions is generated by combining a first user-item value generated by the user variational autoencoder model and a second user-item value generated by the item variational autoencoder model.

11. The non-transitory computer readable medium of claim 10, wherein the one or more latent space representations of the set of prior interactions are an average value of the first user-item value and the second user-item value.

12. The non-transitory computer readable medium of claim 8, wherein the trained inference model is configured to generate a plurality of probability distributions for a set of features identified during training of the joint variational autoencoder model.

13. The non-transitory computer readable medium of claim 8, wherein the joint variational autoencoder is configured to estimate a probability distribution according to $$\min \text{KL}(q(z|x) \| p(z|x))$$

where KL is Kullback-Leibler divergence, $p(z|x)$ is an intractable distribution, and $q(z|x)$ is a tractable distribution.

14. The non-transitory computer readable medium of claim 8, wherein the set of latent space representations of one or more items is generated by a second joint variational autoencoder model prior to receiving the user identifier.

15. A method, comprising:
receiving a user identifier corresponding to a set of prior interactions;
generating a set of candidate items;
generating a set of latent space representations of the set of prior interactions and the candidate items using a trained inference model, wherein the trained inference model generates distribution likelihoods for hidden variables and includes a joint variational autoencoder model;
generating a set of k-recommended items based on a comparison of the set of latent space representations of the set of prior interactions and the set of latent space representations of the candidate items;
ranking the set of k-recommended items based on the candidate items and a set of all available items; and
generating a user interface including the ranked set of k-recommended items.

16. The method of claim 15, wherein the joint variational autoencoder model comprises a user variational autoencoder model and an item variational autoencoder model.

17. The method of claim 16, wherein each latent space representation is generated by combining a first user-item value generated by the user variational autoencoder model and a second user-item value generated by the item variational autoencoder model.

18. The method of claim 17, wherein each latent space representation is an average value of the first user-item value and the second user-item.

19. The method of claim 15, wherein the trained inference model is configured to generate a plurality of probability distributions for a set of features identified during training of the joint variational autoencoder model.

20. The method of claim 15, wherein the joint variational autoencoder is configured to estimate a probability distribution according to $$\min \text{KL}(q(z|x) \| p(z|x))$$

where KL is Kullback-Leibler divergence, $p(z|x)$ is an intractable distribution, and $q(z|x)$ is a tractable distribution.

* * * * *